United States Patent
Lambert et al.

(10) Patent No.: US 8,650,273 B2
(45) Date of Patent: Feb. 11, 2014

(54) VIRTUAL SERIAL CONCENTRATOR FOR VIRTUAL MACHINE OUT-OF-BAND MANAGEMENT

(75) Inventors: Timothy M. Lambert, Austin, TX (US); Kareem S. Seddik, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 743 days.

(21) Appl. No.: 12/472,894

(22) Filed: May 27, 2009

(65) Prior Publication Data

US 2010/0306763 A1 Dec. 2, 2010

(51) Int. Cl.
*G06F 15/173* (2006.01)

(52) U.S. Cl.
USPC .......................................................... 709/223

(58) Field of Classification Search
USPC .......................................................... 709/223
See application file for complete search history.

(56) References Cited

U.S. PATENT DOCUMENTS

| | | | | |
|---|---|---|---|---|
| 5,287,461 | A * | 2/1994 | Moore | 709/219 |
| 7,536,525 | B2 | 5/2009 | Chandrasekaran et al. | |
| 7,917,811 | B2 * | 3/2011 | Yamamoto | 714/44 |
| 2005/0132367 | A1 * | 6/2005 | Tewari et al. | 718/1 |
| 2006/0184349 | A1 * | 8/2006 | Goud et al. | 703/24 |
| 2009/0198862 | A1 * | 8/2009 | Okitsu et al. | 710/316 |
| 2010/0318993 | A1 * | 12/2010 | Goud et al. | 718/1 |
| 2011/0035494 | A1 * | 2/2011 | Pandey et al. | 709/224 |
| 2011/0185357 | A1 * | 7/2011 | Hashimoto et al. | 718/1 |

OTHER PUBLICATIONS

K. Kettler et al, U.S. Appl. No. 12/354,446, filed Jan. 15, 2009, Title: System for Enabling Virtual Services on a Business and a Consumer Device.
K. Kettler et al., U.S. Appl. No. 12/172,544, filed Jul. 14, 2008, Title: Virtualization Based Personalizable Consumer Electronics Platform.
William A. Curtis et al., U.S. Appl. No. 12/423,164, filed Apr. 14, 2009, Title: Virtualization Based Conditional Access Tuner Module for Providing Secure Linear and Nonlinear Content Services.
K. Kettler et al., U.S. Appl. No. 12/251,001, filed Oct. 14, 2008, Title: Enabling Throttling of Resources on a Virtualization Enabled Information Handling System.
K. Kettler et al., U.S. Appl. No. 12/416,396, filed Apr. 1, 2009, Title: Method and Apparatus to Secure Contents on a Consumer Virtual Appliance.

* cited by examiner

*Primary Examiner* — Jeffrey Nickerson
(74) *Attorney, Agent, or Firm* — Terrile, Cannatti, Chambers & Holland, LLP; Stephen A. Terrile

(57) ABSTRACT

A system and method for providing dynamic access through which I/O access such as serial ports, and thus administrators who manage servers, can see, obtain health, state or interact concurrently with multiple VMs on a given physical server. More specifically, in certain embodiments, the system and method includes a dynamic port count virtual serial concentrator coupled with a virtualization device to map emulated serial ports to virtual machines along with a remote plugin that provide dynamic concurrent serial access to many virtual machine serial consoles under a secure and collaborative friendly environment.

6 Claims, 4 Drawing Sheets

VIRTUAL SERIAL CONCENTRATOR FOR VIRTUAL MACHINE OUT-OF-BAND MANAGEMENT

BACKGROUND OF THE INVENTION

1. Field of the Invention

The present invention relates to information handling systems and more particularly to virtual machine out-of-band management in information handling systems.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is know to provide virtualization enabled information handling systems (i.e., information handling systems that implement virtual machines). An issue arises with information handling systems that implement virtual machines when the information handling systems are server type information handling systems. More specifically server management remote access methods and virtual machines often do not work well together. Administering a server via a remote access controller such as the integrated Dell Remote Access Controller (iDRAC) available from Dell Incorporated or a baseboard management controller (BMC), etc does not provide visibility of the state or provide simultaneous access to virtual machines.

For example, if an in-band network connections to a physical server are lost, then access to the virtual machines of that server may also be lost. In this case, managing, reconfiguring connectivity, etc. becomes more difficult to accomplish. A DRAC can often only be used in a one to one fashion via a virtual keyboard video mouse (vKVM) controller or a serial controller.

Also for example, serial console redirection to a server host (e.g., via a serial emergency management port (EMP), serial over local area network (LAN) connection (often referred to as SOL), etc,) often require a basic input output system (BIOS) which enables physical UARTs built into the chipset, super input/output (I/) or other host accessible logic of the server type information handling system. Also for example, known remote management implements health and remote access in a one to one scenario (e.g., BMC/iDRAC to a single host). Out of band remote access to multiple virtual machines uses a vKVM in a one to one manner.

Accordingly, it would be desirable to provide dynamic access through which I/O access such as serial ports, and thus administrators who manage servers, can see, obtain health, state or interact concurrently with multiple VMs on a given physical server.

SUMMARY OF THE INVENTION

In accordance with the present invention, a system and method for providing dynamic access through which I/O access such as serial ports, and thus administrators who manage servers, can see, obtain health, state or interact concurrently with multiple VMs on a given physical server. More specifically, in certain embodiments, the invention includes a dynamic port count virtual serial concentrator coupled with a virtualization device to map emulated serial ports to virtual machines along with a remote plugin that provide dynamic concurrent serial access to many virtual machine serial consoles under a secure and collaborative friendly environment.

When a new virtual machine is launched, the hypervisor sends an intelligent platform management interface (IPMI) original equipment manufacturer (OEM) type command to the remote access controller indicating the number of serial ports requested, host names and mapping of each. The remote access controller emulates that number of composite universal serial bus (USB) serial class device ports to the host. The hypervisor then maps each virtual machine's serial (e.g., COM) port to a physical COM port as emulated via the universal serial bus from the remote access controller. At this point, each virtual machine is assigned one or more serial port addresses that it uniquely owns and always writes to that COM port address (as if this were an operating system message spewing operation and serial console access.)

A remote access controller plugin, which is served up from a BMC to the remote client user, allows many remote users to see all of the serial sessions live and provides the remote users with the ability to control any of the serial sessions. This function allows multiple remote users to interact with particular virtual machines at the same time, thereby enabling concurrent out of band many to many control and access to virtual machines as if they were real. Additionally, any user can invoke privacy, observer only or free use of any of the ports.

When a virtual machine is terminated, the hypervisor sends an IPMI OEM type command requesting the COM port to be freed and the remote access controller complies and the host hypervisor removes that virtual machine and the remote access controller removes the USB emulated virtual serial port that maps to the now removed virtual machine. Because the remote access controller sent the host names and mappings, the client side plugin allows for easier identification of the desired virtual machine in a similar fashion to a KVM appliance access to graphics consoles.

Such a system enables multiple remote administrators to simultaneously observe the state and control the serial ports of any number of virtual machines on a physical server (e.g., booting, kernel panic, running, etc.), thereby providing enhanced value for the server (e.g., virtual machine states before physical shutdown, etc.). Additionally, such a system does not require remote access controller enhancements or additional hardware requirements of the server type information handling system. Additionally, such a system does not present any additional BIOS requirements to initialize or control a universal asynchronous receiver/transmitter (UART).

BRIEF DESCRIPTION OF THE DRAWINGS

The present invention may be better understood, and its numerous objects, features and advantages made apparent to FIG. 1 shows a system block diagram of an information handling system.

DETAILED DESCRIPTION

Figure 1:
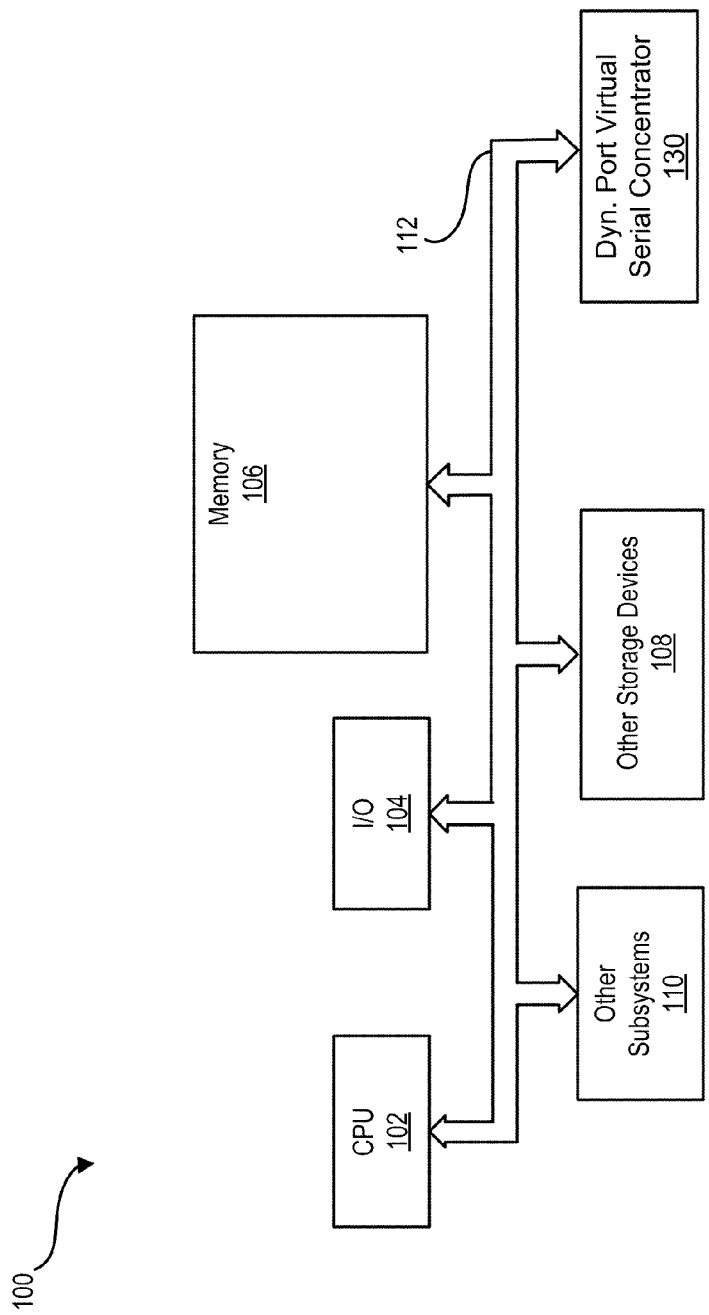

Referring briefly to FIG. 1, a system block diagram of an information handling system 100 is shown. The information handling system 100 includes a processor 102, input/output (I/O) devices 104, such as a display, a keyboard, a mouse, and associated controllers (each of which may be coupled remotely to the information handling system 100), a memory 106 including volatile memory such as random access memory (RAM) and non-volatile memory such as a hard disk and drive, and other storage devices 108, such as an optical disk and drive and other memory devices, and various other subsystems 110, all interconnected via one or more buses 112. The information handling system 100 also includes a dynamic port virtual serial connector 130.

The memory 106 stores a system for providing dynamic access through which I/O access such as serial ports, and thus administrators who manage servers, can see, obtain health, state or interact concurrently with multiple VMs on a given physical server. More specifically, the system includes a dynamic port count virtual serial concentrator coupled with a virtualization device to map emulated serial ports to virtual machines along with a remote plugin that provide dynamic concurrent serial access to many virtual machine serial consoles under a secure and collaborative friendly environment.

The virtual appliance device 120 can include one or a plurality of virtual appliances. Each virtual appliance is a self-contained virtual machine that implements a solution (including an operating system (OS), and application and a default configuration). Examples of self-contained virtual machines can include a productivity module and browser, a media server/content delivery module, a home finance/online banking module, a gaming module, a personal networking module, a home automation and security module, and a home design and maintenance module. Because the virtual machines are self-contained and isolated using virtualization technology, each solution can be preconfigured and ready to use, without a customer having to install and configure the solution. Additionally, the virtual machines provide a stable platform which have no variability when moved from one user or system to another user or system.

Figure 2:
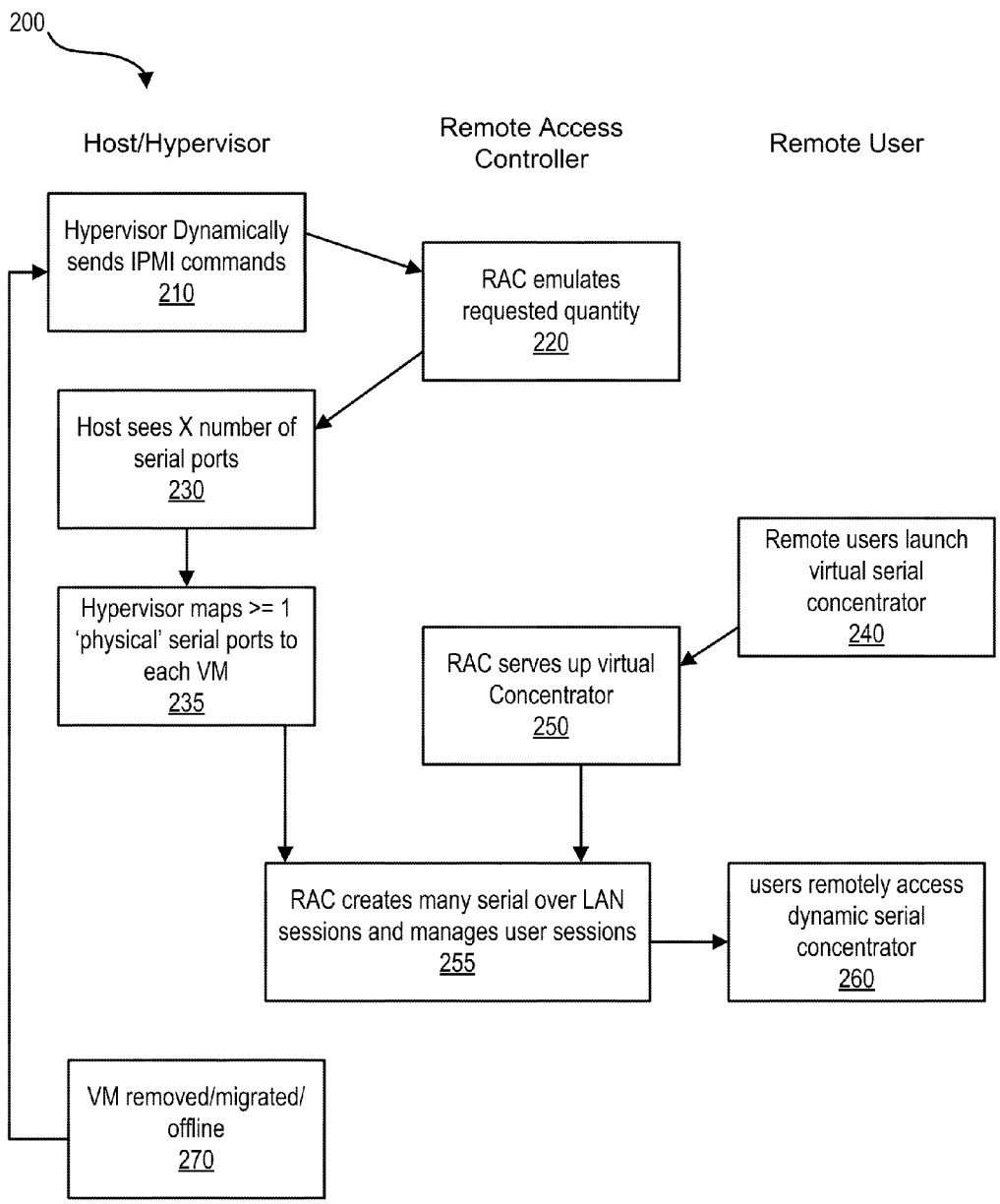
FIG. 2 shows a block diagram of the operation of a dynamic port count virtual serial concentrator

Each of the virtual appliances interacts cooperatively with the information handling system 100 via a respective virtual appliance 120. Thus, host and the virtual appliance have a one to many symbiotic relationship. Using a virtual appliance 120 not only simplifies an initial invocation, but also subsequent desire to move the virtual machine. FIG. 2 shows the architecture diagram of the information handling system 100.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring to FIG. 2, a block diagram of the operation 200 of a dynamic port count virtual serial concentrator 130 is shown. More specifically, when a new virtual machine is launched, the hypervisor sends an intelligent platform management interface (IPMI) original equipment manufacturer (OEM) type command to the remote access controller indicating the number of serial ports requested, host names and mapping of each at step 210. The remote access controller emulates that number of composite universal serial bus (USB) ports to the host at step 220. After the mapping, the host has that many ports appear or disappear at step 230.

The hypervisor then maps each virtual machine's serial (e.g., COM) port to a physical COM port as emulated via the universal serial bus from the remote access controller at step 235. At this point, each virtual machine is assigned one or more serial port addresses that it uniquely owns and always writes to that COM port address (as if this were an operating system message spewing operation and serial console access.)

At step 240, a remote user launches a virtual serial concentrator plugin. The remote access controller virtual serial concentrator plugin allows many remote users to see all of the serial sessions live and provides the remote users with the ability to control any of the serial sessions. Upon launching the plugin, the remote access controller serves up the virtual concentrator at step 250. With the combination of the hypervisor mappings generated at step 235 and the execution of the virtual concentrator at step 250, the remote access controller creates many serial over LAN sessions and manages user sessions at step 255. This function allows multiple remote users to interact with particular virtual machines at the same time at step 260, thereby enabling concurrent out of band many to many control and access to virtual machines as if they were real. Additionally, any user can invoke privacy, observer only or free use of any of the ports.

When a virtual machine is terminated such as at step 270, the hypervisor sends an IPMI OEM type command requesting the COM port to be freed and the remote access controller complies and the plugin removes that virtual machine. Because the remote access controller sent the host names and mappings, the client side plugin allows for easier identification of the desired virtual machine in a similar fashion to a KVM appliance access to graphics consoles.

Figure 3:
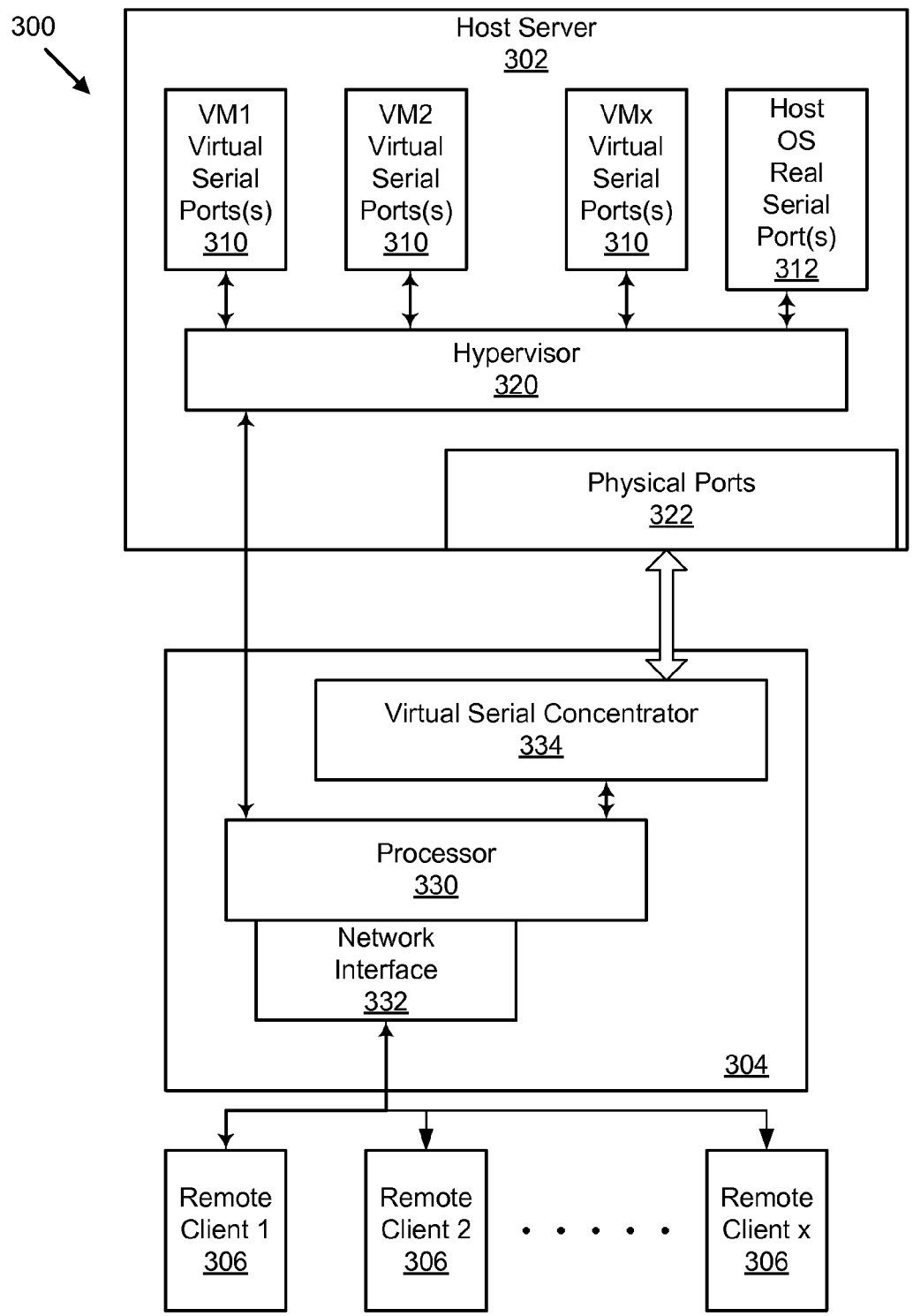
FIG. 3 shows a system block diagram of an information handing system configured via the dynamic port count virtual serial concentrator.

Referring to FIG. 3, a system block diagram of an information handing system environment 300 configured via the dynamic port count virtual serial concentrator is shown. More specifically, the information handling system environment 300 includes a host server 302, a remote access controller 304 and one or more remote clients 306.

The host server 302 includes one or more virtual machine virtual serial ports 310 as well as a host operating system real serial port (or ports) 312. The host server also includes a hypervisor 320 as well as a plurality of physical ports 322. Each of the virtual machine virtual serial ports 310 is coupled to the hypervisor 320. The host operating system real serial port 312 is also coupled to the hypervisor 320. The hypervisor 320 manages mapping the physical ports 322 to the virtual ports 310.

The remote access controller includes a processor 330 as well as a network interface 332 and a virtual serial concentrator 334. The processor is coupled to the network interface 332 as well as to the hypervisor 320. The virtual serial concentrator 334 is coupled to the processor 330 as well as to the physical ports 322 of the host server 302. The network interface is coupled to the remote client or remote clients 306. The virtual serial concentrator includes a composite device (such as a universal serial bus device) which emulates the virtual serial concentrator.

Figure 4:
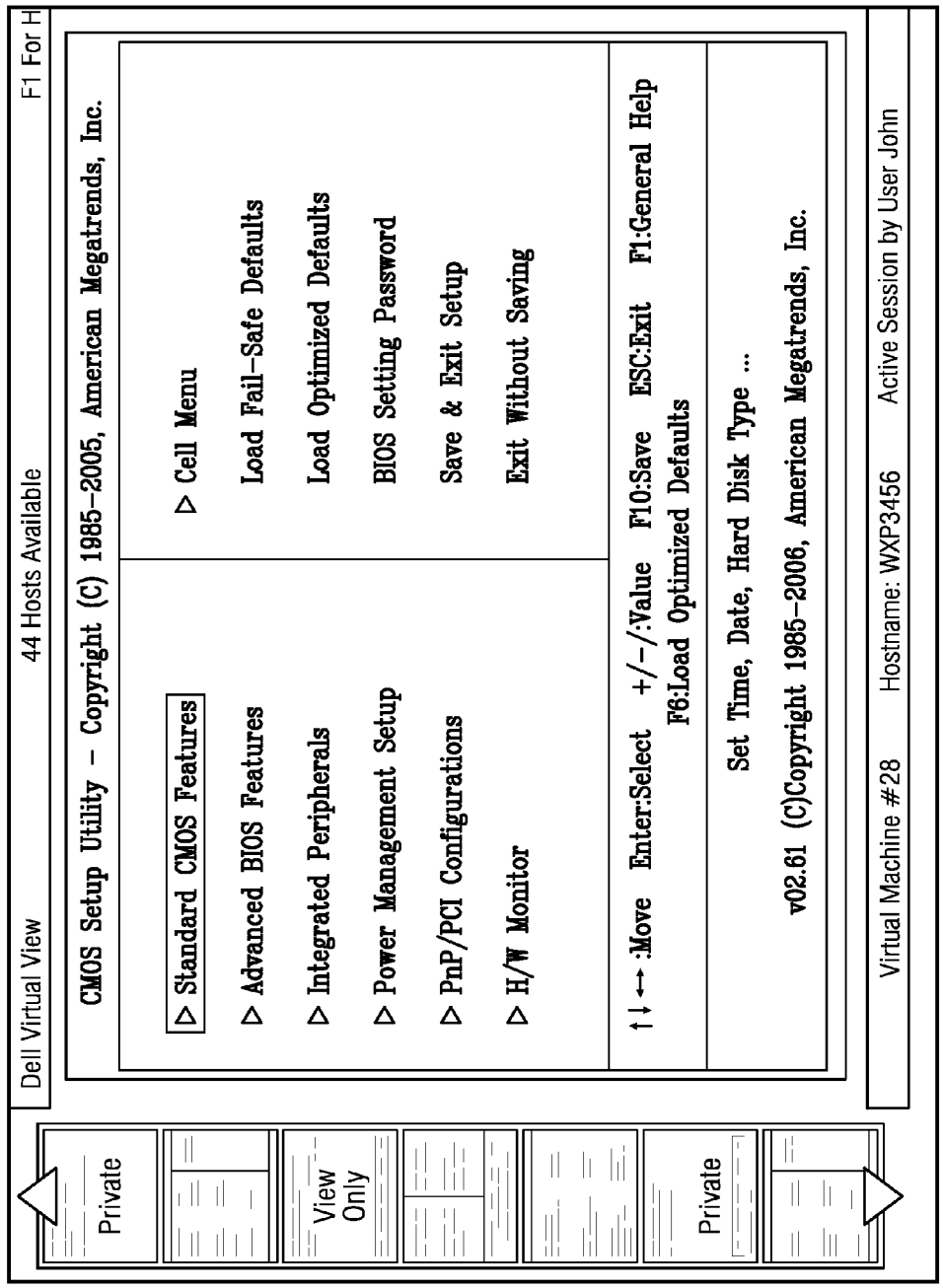
FIG. 4 shows an example screen presentation generated by the dynamic port count virtual serial concentrator.

Referring to FIG. 4, an example screen presentation generated by the dynamic port count virtual serial concentrator is shown.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Also for example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably, or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A method for providing virtual machine out-of-band management in information handling systems comprising:
providing an information handling system comprising a host server and a remote access controller; wherein the host server comprises a host operating system, a plurality of virtual machines, and a hypervisor; wherein the remote access controller comprises a virtual serial concentrator;
sending, using the hypervisor, an intelligent platform management interface (IPMI) original equipment manufacturer (OEM) type command to the remote access controller when a new virtual machine is launched on the host server;
wherein the sent IPMI OEM type command indicates a number of serial ports requested, host names, and a mapping of each requested serial port;
in response to receiving the IPMI OEM command, the remote access controller emulating the number of requested serial ports with a number of composite universal serial bus (USB) ports to the host server;
allowing, via the virtual serial concentrator, a plurality of remote users to concurrently access a plurality of serial management consoles of the plurality of virtual machines by creating serial over LAN control sessions using the emulated serial ports;
allowing, via the remote access controller, any of the plurality of remote users to view and control any of the created serial over LAN control sessions.

2. The method of claim 1 wherein:
after emulating the number of serial ports requested, the hypervisor then maps a serial port of a virtual machine to a physical port as emulated via the universal serial bus from the remote access controller.

3. The method of claim 2 wherein:
after mapping the a-serial port of a virtual machine to the physical port, each virtual machine is assigned one or more serial port addresses, the one or more serial port addresses being uniquely owned by the virtual machine so that the virtual machine always writes to the assigned port address.

4. An information handling system for providing virtual machine out-of-band management, comprising:
a host server device comprising a host operating system, a plurality of virtual machines, and a hypervisor; and
a remote access controller device comprising a virtual serial concentrator;
wherein the hypervisor is configured to send an intelligent platform management interface (IPMI) original equipment manufacturer (OEM) type command to the remote access controller device when a new virtual machine is launched on the host server;
wherein the sent IPMI OEM type command indicates a number of serial ports requested, host names, and a mapping of each requested serial port;
wherein the remote access controller device is configured to, in response to receiving the IPMI OEM command, emulate the number of requested serial ports with a number of composite universal serial bus (USB) ports to the host server;
wherein the virtual serial concentrator is configured to allow a plurality of remote users to concurrently access a plurality of serial management consoles of the plurality of virtual machines by creating serial over LAN control sessions using the emulated serial ports; and
wherein the remote access controller device is further configured to allow any of the plurality of remote users to view and control any of the created serial over LAN control sessions.

5. The apparatus of claim 4 wherein:
after emulating the number of serial ports requested, the hypervisor then maps a serial port of a virtual machine to a physical port as emulated via the universal serial bus from the remote access controller device.

6. The apparatus of claim 5 wherein:

after mapping the serial port of a virtual machine to a physical port, each virtual machine is assigned one or more serial port addresses, the one or more serial port addresses being uniquely owned by the virtual machine so that the virtual machine always writes to the assigned port address.

* * * * *